E. V. RAWLINS.
EMERGENCY CROSS CHAIN.
APPLICATION FILED JULY 21, 1921.

1,409,025.

Patented Mar. 7, 1922.

Inventor
E. V. Rawlins,

By
Attorney

UNITED STATES PATENT OFFICE.

ELBERT V. RAWLINS, OF APPLETON CITY, MISSOURI.

EMERGENCY CROSS CHAIN.

1,409,025.  Specification of Letters Patent.  Patented Mar. 7, 1922.

Application filed July 21, 1921. Serial No. 486,400.

*To all whom it may concern:*

Be it known that ELBERT V. RAWLINS, a citizen of the United States of America, residing at Appleton City, in the county of St. Clair and State of Missouri, has invented new and useful Improvements in Emergency Cross Chains, of which the following is a specification.

The object of the invention is to provide a simple and efficient means whereby an anti-skid chain may be applied to an automobile or other vehicle wheel without jacking up the car or when embedded in mud and therefore having no tractive effect, and without the inconveniences incident to manually forcing one end of the chain into the mud and under the tire sufficiently to enable the latter to be rolled upon the chain preparatory to the connection of the ends of the chain; and with this object in view the invention consists in a construction and combination of parts of which a preferred embodiment is shown in the accompanying drawings, wherein:—

Figure 1:
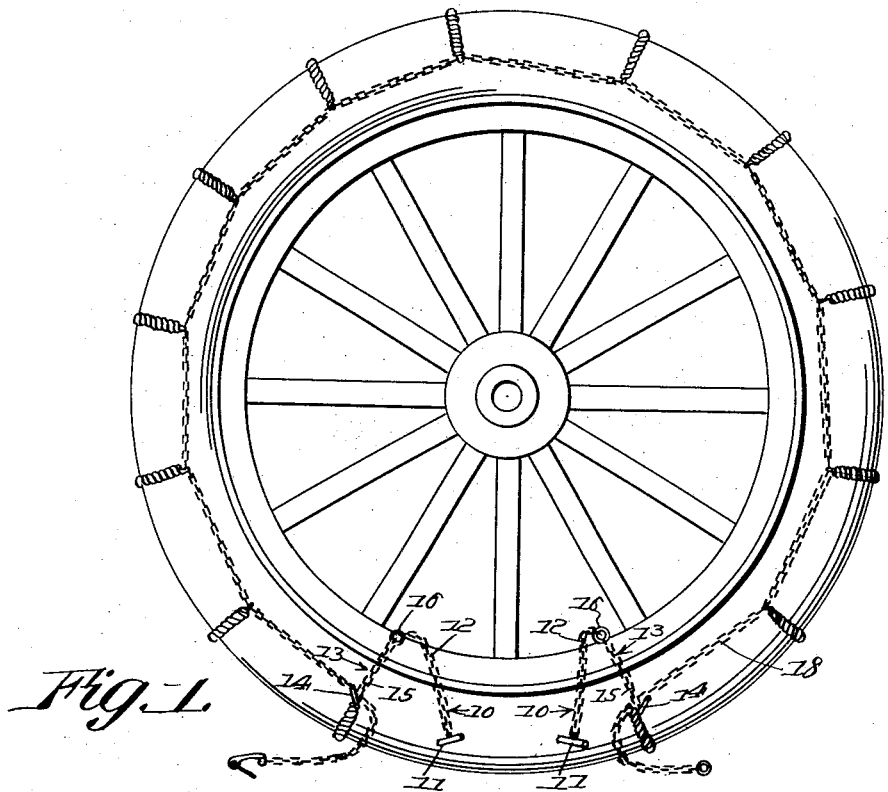
Figure 1 is a view of a pair of emergency devices constructed in accordance with the invention applied in the operative position to an anti-skid chain on an automobile or similar wheel.
Figure 2:
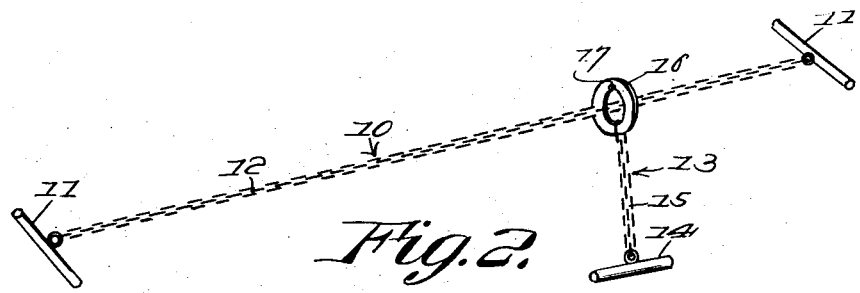
Figure 2 is a detail view of the emergency chain.

The device consists essentially of a grapple having a main member 10 comprising terminal cross heads 11 connected flexibly as by a chain or cable 12 to an auxiliary member 13 comprising a cross head 14 flexibly connected as by a chain or cable 15 with a runner 16 mounted upon the flexible element of the main member and consisting of an eye or ring having a seat or notch 17 adapted for engagement with the flexible element of the main member such as a link of the chain constituting said element.

In use one of the terminal cross heads of the main member is engaged with a tire chain 18 at one end thereof and the cross head 14 of the auxiliary member is engaged with the tire chain at the same end but at the opposite side of the plane of the wheel tire from the first-named cross head so that the flexible elements connected with said cross heads of the main and auxiliary members cross the rim of the wheel at its inner side between two of the spokes. The cross head at the other or free end of the main member is then grasped and the flexible connection is drawn taut and engaged with the seat or notch 17 of the runner or eye 16 so as to clamp the end of the tire chain to the tire.

The other end of the tire chain then being carried over the wheel as shown in Figure 1 to a point conveniently near the ground is clamped to the wheel in the same way as above described by another emergency chain, so that both ends of the tire chain are locked to the wheel tire at points near the ground but of course not passing under the wheel. The wheel may then be turned either forward or backward to bring the space between the separated extremities of the tire chain to the upper side of the wheel and the emergency chains may be loosened and the extremities of the tire chain connected in the ordinary way.

The device serves as a means of anchoring or securing the extremities of the tire chain to expose portions of the wheel tire at convenient points above the portion of the tire which is in contact with the ground to maintain the tire chain in position on the wheel during the movement of the vehicle to expose that portion of the tire which was embedded in the mud, so that the operation of fastening the extremities of the tire chain in the usual way may be effected without involving the operator in the inconveniences ordinarily encountered in this operation. The emergency chain constitutes a temporary clamp for attaching the extremities of the tire chain to the wheel under such conditions as to prevent the slipping thereof by reason of the rotation of the vehicle wheel during the positioning of the tire chain upon the wheel.

Having described the invention, what is claimed as new and useful is:—

1. A device for temporarily attaching the extremity of a tire chain to a vehicle wheel in the operation of applying said chain to the wheel which consists of a flexible member having terminal means for engaging a tire chain and a second member also provided with means for engaging a tire chain and having a running engagement with the first-named member.

2. A device for temporarily attaching the extremity of a tire chain to a vehicle wheel in the operation of applying said chain to the wheel which consists of a flexible member having terminal means for engaging a tire chain and a second member also provided with means for engaging a tire chain and having a running engagement with the first-named member, the first-named member comprising a flexible element having terminal cross heads.

3. A device for temporarily attaching the extremity of a tire chain to a vehicle wheel in the operation of applying said chain to the wheel which consists of a flexible member having terminal means for engaging a tire chain and a second member also provided with means for engaging a tire chain and having a running engagement with the first-named member, the second-named member having a ring or eye for receiving the first-named member.

4. A device for temporarily attaching the extremity of a tire chain to a vehicle wheel in the operation of applying said chain to the wheel which consists of a flexible member having terminal means for engaging a tire chain and a second member also provided with means for engaging a tire chain and having a running engagement with the first-named member, the second-named member having a ring or eye for receiving the first-named member and provided with a seat or notch for engaging the same.

5. A device for temporarily attaching the extremity of a tire chain to a vehicle wheel in the operation of applying said chain to the wheel which consists of a flexible member having terminal means for engaging a tire chain and a second-member also provided with means for engaging a tire chain and having a running engagement with the first-named member, the second-named member compressing a terminal cross head flexibly connected with a ring or eye through which the first-named member extends.

In testimony whereof he affixes his signature.

ELBERT V. RAWLINS.